Figure 4:
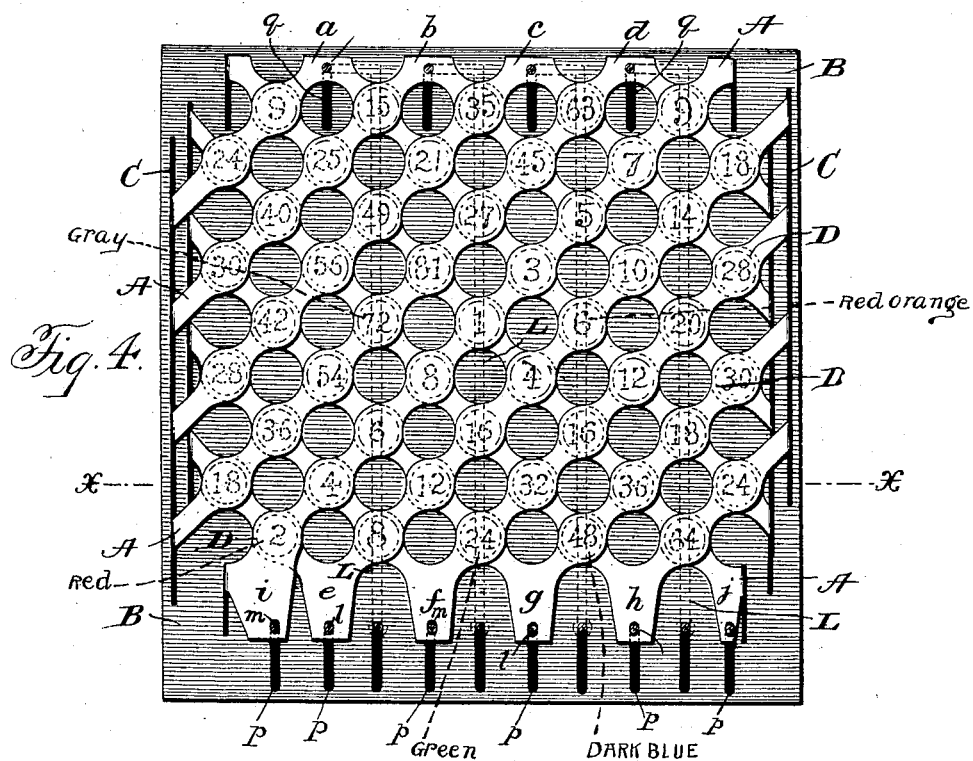

No. 771,394. PATENTED OCT. 4, 1904.
W. H. ROBERTSON.
DEVICE FOR EDUCATIONAL, AMUSEMENT, OR OTHER PURPOSES.
APPLICATION FILED APR. 29, 1902.
NO MODEL. 6 SHEETS—SHEET 1.
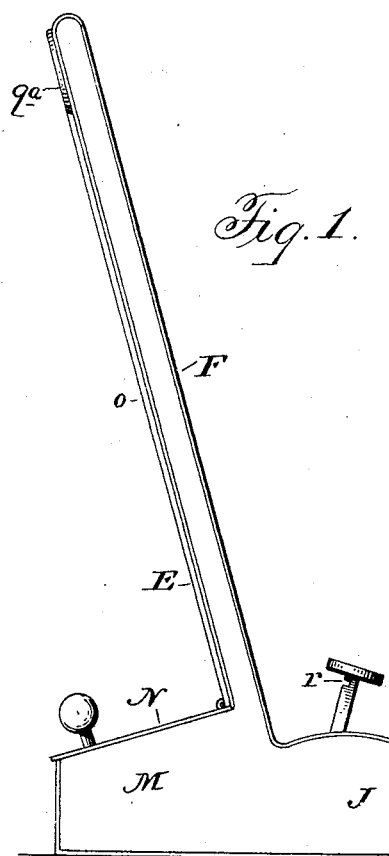
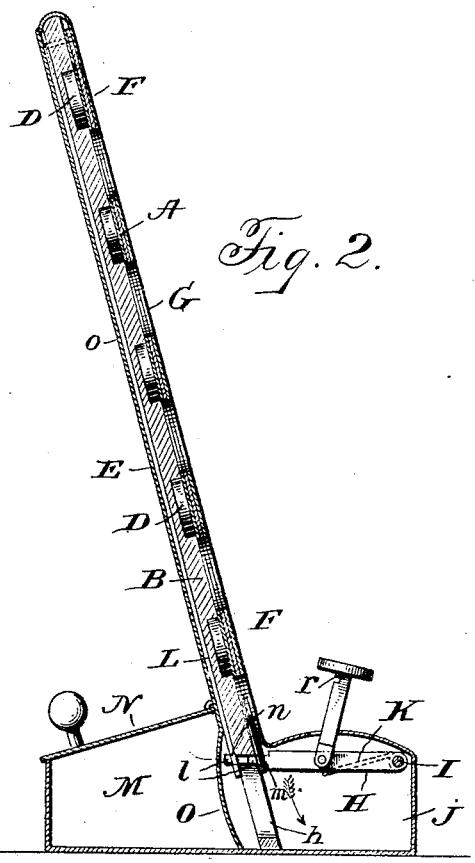
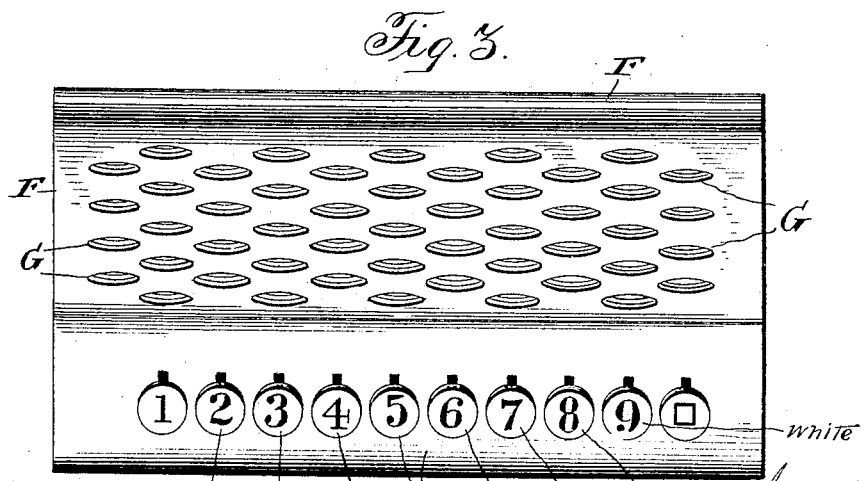

No. 771,394. PATENTED OCT. 4, 1904.
W. H. ROBERTSON.
DEVICE FOR EDUCATIONAL, AMUSEMENT, OR OTHER PURPOSES.
APPLICATION FILED APR. 29, 1902.
NO MODEL. 6 SHEETS—SHEET 2.

No. 771,394. PATENTED OCT. 4, 1904.
W. H. ROBERTSON.
DEVICE FOR EDUCATIONAL, AMUSEMENT, OR OTHER PURPOSES.
APPLICATION FILED APR. 29, 1902.
NO MODEL. 6 SHEETS—SHEET 3.

Witnesses: Jas. E. Hitchinson. Inventor. Wm. H. Robertson.

No. 771,394. PATENTED OCT. 4, 1904.
W. H. ROBERTSON.
DEVICE FOR EDUCATIONAL, AMUSEMENT, OR OTHER PURPOSES.
APPLICATION FILED APR. 29, 1902.
NO MODEL. 6 SHEETS—SHEET 4.
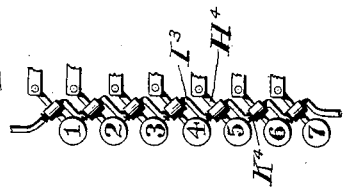
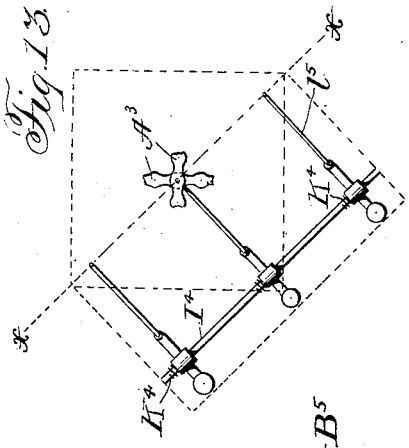
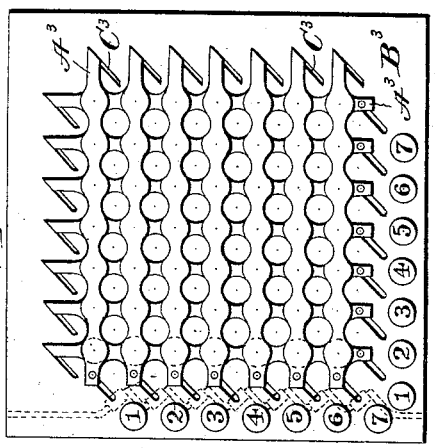
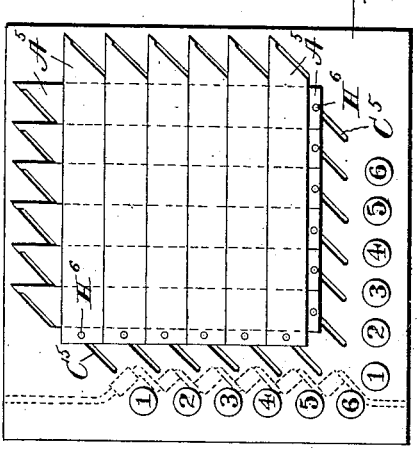
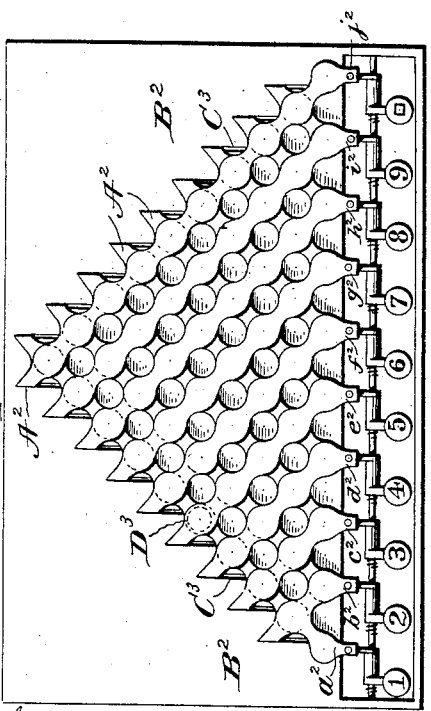

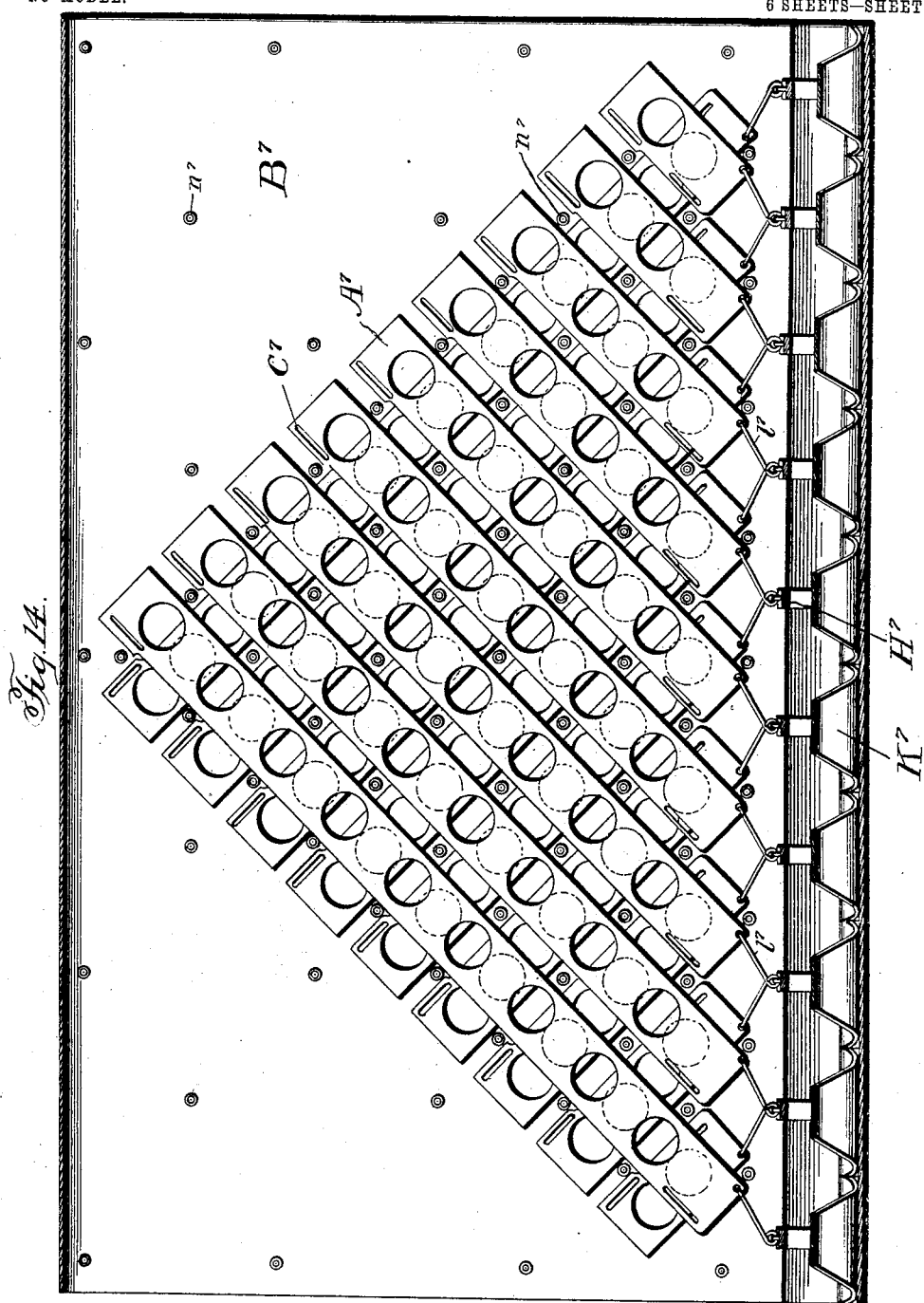

No. 771,394. PATENTED OCT. 4, 1904.
W. H. ROBERTSON.
DEVICE FOR EDUCATIONAL, AMUSEMENT, OR OTHER PURPOSES.
APPLICATION FILED APR. 29, 1902.
NO MODEL. 6 SHEETS—SHEET 6.
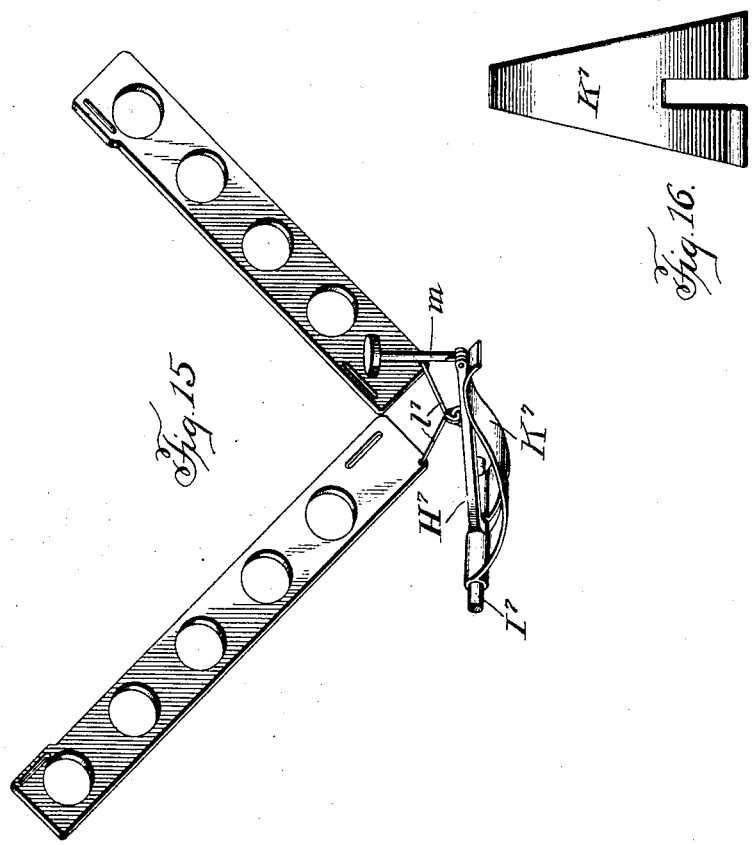
WITNESSES:
INVENTOR
BY
Attorney No. 771,394. Patented October 4, 1904.

UNITED STATES PATENT OFFICE.

WILLIAM H. ROBERTSON, OF AUSTIN, TEXAS, ASSIGNOR, BY MESNE ASSIGNMENTS, OF ONE-FOURTH TO WILLIAM G. HENDERSON, OF WASHINGTON, DISTRICT OF COLUMBIA, AND ARITHMO-GAME BOARD COMPANY, A CORPORATION OF MISSOURI.

DEVICE FOR EDUCATIONAL, AMUSEMENT, OR OTHER PURPOSES.

SPECIFICATION forming part of Letters Patent No. 771,394, dated October 4, 1904.

Application filed April 29, 1902. Serial No. 105,167. (No model.)

*To all whom it may concern:*

Be it known that I, WILLIAM H. ROBERTSON, a citizen of the United States, residing at Austin, in the county of Travis and State of Texas, have invented certain new and useful Improvements in Devices for Educational, Amusement, or other Purposes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device designed for educational and amusement and calculating purposes; and it contemplates employment of a number of slides arranged to operate at an angle to each other, so that when two slides are moved one at an angle to the other and arranged to intersect each other there will be exhibited at the point of intersection a character, which may be a numeral, a letter, or other character or symbol, that may be placed at the point of display. If it be the multiplication-table that is to be taught or a calculation made, the numerals will be so placed that when any two slides intersecting or crossing each other are moved there will be displayed at the point of intersection the product of the two numerals applied to designate the two intersecting slides. On the other hand, if the instruction is to relate to colors certain of the slides, or rather their operating-keys, will be designated by the primary colors, including white and black, and at the point where two slides intersect or cross each other will be placed the color formed by combining the two colors which designate the two keys depressed, so that at the point of intersection will be displayed the color formed by mixing the two colors whose keys actuate the two slides which cross or intersect each other, and thus the child may be instructed concerning the combination of colors. Again, if any particular game is to be played involving the exhibition of a character or symbol or device or devices the movement of any two particular slides crossing or intersecting each other will display at the point of intersection or crossing of the slides the particular character, symbol, or device located at that point, and there may be as many characters, symbols, or devices as there are points of intersection of the different slides employed, and by moving any number of the slides intersecting each other there may be exposed to view as many different characters, symbols, or devices as there are intersecting points of display, so that different configurations may be formed and exhibited, according as a greater or less number of the intersecting slides are moved to expose to view different points of display. It will therefore be perceived that the device is susceptible of use for a variety of games for either educational or amusement purposes, and there may be very many modifications or variations in the arrangement and manipulation of the slides all embraced within the scope of my invention.

To the accomplishment of the foregoing and such other objects as may hereinafter appear the invention consists in a device or game-board embodying features which will be hereinafter particularly described and then sought to be clearly defined by the claims, reference being had to the accompanying drawings, forming a part hereof, and in which—

Figure 5:
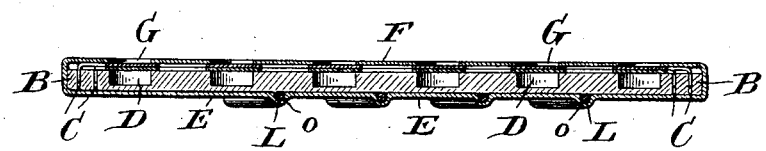
Figure 6:
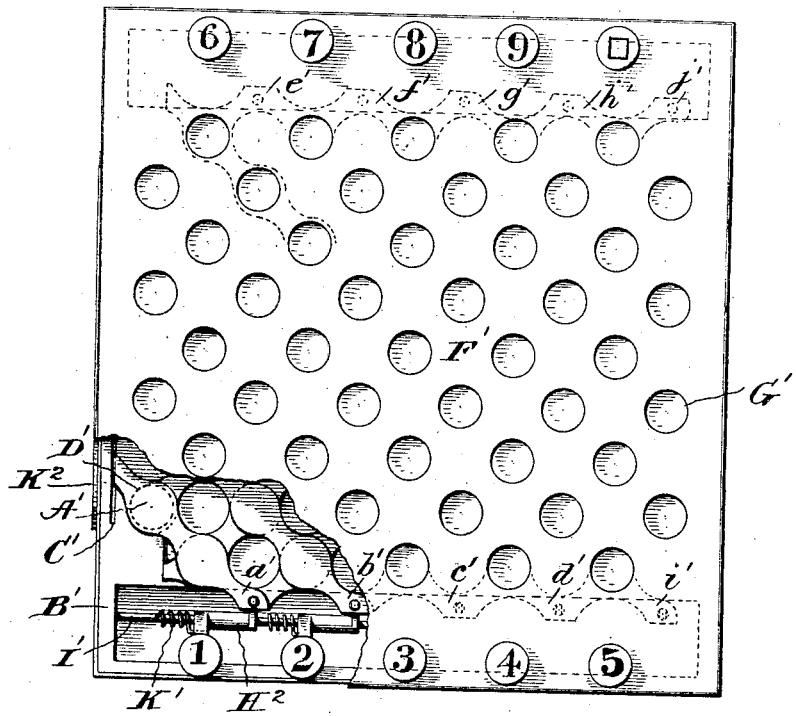
Figure 7:
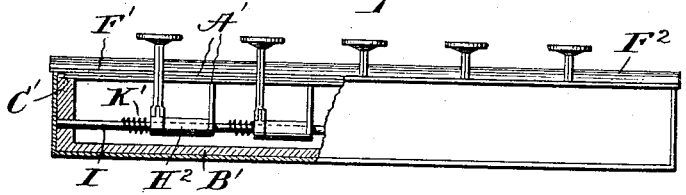
Figure 8:
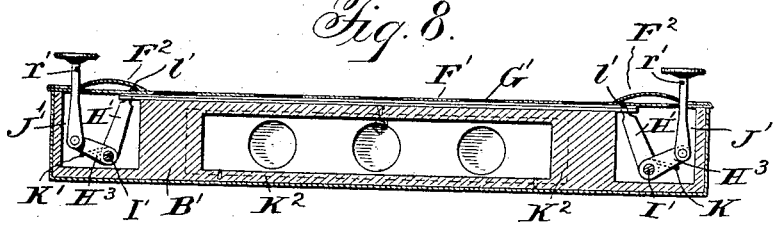

Figure 1 is an end elevation of one form of the device. Fig. 2 is a vertical cross-section of the same. Fig. 3 is a plan of the same. Fig. 4 is a plan of the back board or plate of Fig. 2, showing the arrangement of the slides. Fig. 5 is a horizontal cross-section through Fig. 2. Fig. 6 is a plan of a modified form with a portion of the front face broken away. Fig. 7 is an end elevation of Fig. 6. Fig. 8 is a vertical cross-section of Fig. 6. Fig. 9 is a plan view of another modification with the front plate removed. Fig. 10 is a plan of another modification with the front plate removed. Fig. 11 is a plan of another modification with the front plate removed. Fig. 12 is a detail plan showing manner of connecting the operating-keys to the slides under the form illustrated in Fig. 10. Fig.

13 is a diagrammatic view of another modification. Fig. 14 is a plan of another modification with the face plate removed. Fig. 15 is a detail of one pair of the slides of Fig. 14, showing the manner of connecting the same to the operating lever; and Fig. 16 is a view of one of the lever-springs employed in connection with the form illustrated in Fig. 14.

One form of the invention consists of a number of slides A, formed with scallop-shaped edges and arranged in diagonal lines, (see Figs. 4, 6, and 9,) with some of the slides crossing the others, the circular portions of one set of slides lying over the circular portions of another set of slides, thus leaving circular-shaped openings between the several slides, the boundary-lines of such openings being formed by the edges of the slides, as illustrated in Fig. 4 of the drawings. Certain of these slides are shown as having two members which are connected together, for instance, by necks at the points $a$, $b$, $c$, and $d$, and others are shown as having two members connected together, for instance, by necks at the points $e$, $f$, $g$, and $h$, which last-mentioned necks may be extended more or less, so as to have operating-keys, hereinafter described, connected therewith, while two of the slides are shown as having only one member each, said two slides being formed one with an extension $i$ and the other with an extension $j$ to have connected therewith two of the operating-keys to be described hereinafter. These several slides lie over a board or back B and are connected therewith by suitable means which will serve to guide the slides in their movement, a simple means for the purpose being afforded by slits C, formed in the back board, and by bending a portion of each slide so as to form a flange which will fit within the proper slit and work therein in the movement of the slides, although any other suitable means for the purpose may be employed. The slides and the back board may be made of metal or other suitable material. In this form of the device the back board will be formed with a number of openings D, which will lie immediately back of the circular portions of the slides when the slides are in their normal positions, said openings at such time being concealed by the circular portions of the slides. When, however, any two of the slides which cross each other are moved, they will uncover the opening at the point where the two slides in their normal position cross or intersect each other and expose to view the opening in the back board at that point or whatever object may have been placed in the opening at such point. It will be observed that under the arrangement of slides illustrated in Fig. 4 they will move in a straight path, although in oblique lines.

The back board, with its slides, in this form of the invention will be inclosed in a suitable casing, which may, if preferred, be formed of a single piece of metal or other material bent into shape so at to form a backing E and a face-plate F, between which backing and face-plate the back board, with its slides, will fit, and thus be inclosed within the casing thus formed, the back board being held to the casing by pins or rivets applied at appropriate points. The face-plate F will be formed with openings G, which will register with the circular portions of the slides A in their normal position, so that when the slides are moved to expose the openings in the back board said openings or what they may contain may be observed through the openings in the face-plate F.

The slides A will be moved by suitable means provided for that purpose. For this purpose I prefer to use a number of keys, which in this instance are numbered from "1" to "9" and one of them with the character □, the keys 1, 2, 4, 6, 8, and □ being connected with the slides having the extensions $i$, $e$, $f$, $g$, $h$, and $j$, respectively, and the keys 3, 5, 7, and 9 being connected with the slides having extensions $a$, $b$, $c$, and $d$, respectively, so that upon depressing one or more of the keys the slides with which they are respectively connected will be moved. These keys will be connected each with a lever of any suitable construction which will join the key to its appropriate slide to move the latter, the levers being suitably fulcrumed, and a suitable spring will be applied, so that each lever and its connected slides will be restored to their normal positions. A lever suitable for the purpose consists of an arm H, loosely fulcrumed on a rod I, supported in a front compartment J of the casing which incloses the slides and its back board, the lever lying inside of said compartment, and a suitable spring K is provided for restoring and retaining each lever and its connected slide in their normal position. The free end of each lever is connected with its appropriate slide by having the reduced end $l$ of the lever enter a slot $m$, formed in the extension of its appropriate slide—for instance, the levers for the keys 1, 2, 4, 6, 8, and □ will enter the slots formed in the extensions $i$, $e$, $f$, $g$, $h$, and $j$, respectively, while the levers for the keys 3, 5, 7, and 9 will enter slots $n$, formed in the lower ends of the rods L, one rod being provided for each of said mentioned key-levers—which rods at their upper ends are extended laterally, as indicated in Fig. 4 of the drawings, and their points connected with the necks $a$, $b$, $c$, and $d$, respectively, so that when said rods are drawn down by the key-levers the slides with which they are connected as specified will be moved. The rods L lie to the rear of the back board B and will fit in grooves or depressions $o$, formed in the back plate E of the inclosing casing, so that the grooves will form guides for said rods, and the rods at the points where they connect with the necks $a$, $b$, $c$, and $d$ will be bent upwardly, so as to pass through the back board and unite with the necks of the slides on the face side of the back board. The back board B at the points where the free ends of the key-levers pass through the same is formed with slots $p$ for the free ends of the levers to work in, and at the points where the ends of the rods L connect with the slides is formed with slots $q$ for the bent portions of the rods to work in in moving the slides, and the portion of the back plate of the casing for the space traversed by the lateral portions of the rods in moving their slides may be slightly swelled outwardly, as indicated at $q^a$, to permit the free movement of the lateral portions of the rods between the back board and the back plate of the casing.

The arrangement of the rods L and their connection with the slides and with the key-levers described is given merely as an illustration of a suitable arrangement of parts for the purposes mentioned; but changes can be made therein without departing from the invention. The shank of each key passes through the top of the lower front compartment J of the inclosing casing and at its lower end is pivotally connected to its lever, so that when the key is depressed it may be tilted slightly for the purpose of permitting a notch $r$, formed in the edge of its shank, to engage with the edge of the opening through which the shank passes for the purpose of holding down the lever and the slide with which it connects against the influence of the spring employed to restore the parts to their normal position when so desired, a very slight deflection of the key-shank serving to engage or disengage the catch thus formed.

The casing may be formed with a rear compartment M, provided with a hinged cover N and adapted to hold disks or buttons adapted to fit in the openings made in the back board, upon which disks or buttons may be imprinted the numerals, letters, or other characters designed for use in connection with the board in its use for educational or amusement purposes.

The letter O designates a partition between the button-compartment and the portion of the casing in which the operating key-levers and lower ends of the slides and rods operate, which partition may be a continuation of the back plate of the casing.

In operation, assuming that the board is to be used for teaching the multiplication-table or for calculating purposes, there will be placed in each one of the circular openings of the back board a numeral or numerals which is the product of any two of the numerals employed to designate the several keys, the product being placed in the opening at the point where two of the slides cross each other and from over which opening the circular portion of the two slides covering that particular opening will move when the two keys are depressed whose numerals multiplied one by the other will give the product to be exposed to view in the opening from over which their two slides are moved. For instance, suppose that the keys designated by the numerals 1 and 9 both be depressed. The slide with which the key No. 1 connects will be drawn down and the slide with which the key 9 is connected through its rod L will be drawn down, so that at the point where the two slides thus moved cross each other, which, it will be observed, is at the upper right-hand corner of the board, there will be exposed to view through the opening in the front plate the numeral "9," the two slides having moved away from the opening in the back board, so as to expose the product of the two numbers applied at that point. Again, suppose that the keys designated by the numerals 9 and 7 be depressed. The two slides with which they connect by the rods L will at the point where the slides cross each other be moved downward, so as to uncover the opening over which the circular portions of the two slides normally lie, and there will be exposed to view through the opening in the face-plate the numeral "63," which is the product of the two numerals "7" and "9," the point of exposure being at the top of the board and just to the right of the center, that being the point where the two slides cross each other in their normal position. Again, suppose that the keys designated by the numerals 2 and 4 be depressed. In this case the slides to which these keys are connected will be moved downward, and at the point where they cross each other, which in this instance is at the bottom of the board and just to the left of the center, there will be exposed the numeral "8," the same being the product of the two numerals whose keys were depressed. Again, suppose that you want to multiply a number by itself, in which event you would depress the key designated by the numeral to be multiplied by itself, and at the same time depress the key bearing the character □, and for the product you would find the square of the numeral displayed in the opening from over which was moved the two slides which crossed each other. For illustration, press the key having the numeral "4" and at the same time depress the key bearing the character □ and you will have exposed the numeral "16" at the point where the two slides normally cross each other, which in the arrangement of slides shown in the third row from the bottom and just right of the center of the board. Again, suppose that the numeral "9" is to be multiplied by itself. You depress the key 9 and at the same time the key bearing the character □ and there will be exhibited to view the numeral "81," which is the square of 9 and it will appear at the point where the two slides actuated by the two keys cross each other, which in the arrangement shown will be in the fourth row from the top of the board and just to the left of the center. Under the construction and arrangement of the slides so far illustrated when the two keys 2 and 9, or 4 and 7, or 6 and 5, or 8 and 3 are depressed the product of any two of such combinations will appear at the same time at two places, one place of appearance being at the extreme right-hand vertical column of openings and the other at the extreme left-hand vertical column of openings, and while this double appearance will cause no inconvenience, yet if it be desired to avoid the same the numerals can be omitted from either the right or the left hand vertical column, so that the appearance will be only in one of said two columns.

To adapt the board for color instruction, either the keys or the base through which the shanks of the keys pass will be indicated by a separate color for each key applied either to the key or to the base at the point of location of the key. For instance, the keys 2, 3, 4, 5, 6, 7, and 8 will have the principal colors red, orange, yellow, green, blue, violet, and black applied, respectively, thereto, while the key 9 will be white and key 1 without any color-indication marking and also the key designated by the character □, and disks or buttons, one for each of the circular openings in the back board and each of a different color and corresponding, respectively, to the several principal colors mentioned and the colors formed by combining any two of the principal colors mentioned, will be placed in the several openings at the points where the openings will be uncovered by depressing any two keys, so to expose to view at that point the color produced by combining the colors designated by the two keys depressed. For illustration, suppose that the keys 2 and 3, designating, respectively, red and orange, are depressed. There will be exposed to view a button or disk of a red-orange color at the opening uncovered by the two slides actuated by the keys and crossing each other. Again, suppose that the keys 4 and 6, designating yellow and blue, respectively, be depressed. There will be exposed to view at the opening where the two slides actuated by those keys cross each other a disk or button of a green color, which is the color produced by combining yellow and blue. Again, suppose that the keys 6 and 8, designating blue and black, respectively, be depressed. There will be exhibited to view at the point where the two slides actuated by those keys cross each other a disk or button of a dark-blue color, which is formed by combining blue and black. Again, suppose that the keys 1 and 2, the key 1 being colorless and the key 2 designating red, be depressed. There will be exhibited at the point where their two slides cross each other a disk or button red in color. Again, suppose that the keys 8 and 9, the former designating black and the other white, be depressed. There will be exhibited at the point where their slides cross each other a button gray in color, which is formed by mixing white and black, and so throughout the entire number of openings exposed to view by depressing any two of the keys there will be exhibited at the point where the slides actuated by any two of the keys cross each other a button of the color formed by mixing the two colors represented by the two keys depressed. The key 1 and the key □ will each represent no color, and hence when a key bearing a color and the key □ are depressed the color represented by the colored key will appear at the point where the key-slides actuated by the two keys cross each other, because the color will be added to itself, and hence the color of the key will appear, and so when the key 1 is depressed and any one of the keys representing a color is depressed there will be exhibited at the point of crossing of the two slides simply the color represented by the colored key. For convenience in placing the buttons representing the different colors or shades produced by combining certain colors by persons familiar with the mixing of colors each circular opening in the face-plate where a certain color should be exhibited by combining any two colors may be lettered with the name of the color, and the button to be placed in its proper opening may be lettered as well as colored, so as to indicate to the uninformed the proper position for the color to be produced by combining any two colors.

In Figs. 6 to 8 of the drawings I have illustrated a form of the invention in which the board is flat instead of upright, as in the form first described. In the flat-board form the letter B' designates the back board or plate, and the letter A' designates the slides, certain of the slides having their members connected together in pairs at one edge of the board by the necks $a'$, $b'$, $c'$, and $d'$, respectively, and other slides having their members connected together in pairs at the opposite edge of the board or plate by the necks $e'$, $f'$, $g'$, and $h'$, respectively, and one slide at that edge of the board will have a neck $j''$, while another slide will have a neck $i'$ at the opposite edge of the board, said several necks being provided for connection of operating-keys therewith for moving the slides. These slides will each have a portion bent so as to form a flange, and the back board will be formed with slits C' in which the bent portions of the slides will fit, so that the slides may be guided in their movement, and the board will be formed with openings D', lying beneath the circular portions of the slides, for the same purpose as in the first form described. A face-plate F' will lie over the slides A' and will be provided with a series of openings G' corresponding with the openings D' in the back board, and a suitable casing or covering may be provided and formed with compartments J' at opposite sides of the that when a key is depressed the slide connected thereto will be moved, and when the key is released the spring will restore the slide to its normal position. In this form when it is desired to expose to view one of the openings in the back board, it is necessary to depress one of the keys in each of the two rows of keys, which will have the effect of moving the two slides connected to the two keys depressed and uncovering the opening in the back board at the point where the two slides thus moved intersect or normally cross each other, and it will thus be observed that the principle of construction and operation of this form is similar to that in the other forms previously described. Each of these two sets of keys will be journaled in like manner as the other, and Fig. 12 illustrates both. If instead of employing two rows of operating-keys and connecting them to the slides as described, one of the rows of keys should be omitted and the other row should be connected with the slides along the dotted line $x$ $x$, (see Fig. 13,) the slides being connected together in pairs at the point where the links 15, leading from the operating-keys, are connected with the slides, so that two slides will constitute practically a slide of two members and be moved upon depressing any particular key. The effect would be to expose to view upon depressing two keys at every point where the slides thus moved crossed each other one of the openings in the back board, and as under this arrangement the moving slides cross each other at four different points, one point above the dotted line, one below the dotted line, and two on the line, there would be four of the openings in the back board exposed to view, and the points thus exposed to view would present symmetrical figures, the point of exposure above the dotted line corresponding in position to the point exposed below the dotted line. In this way a large number of symmetrical figures or designs can be produced by manipulation of the operating-keys. This, in effect, is combining two of the triangular forms shown in Fig. 9 and forms a square. In Fig. 13 the operating-keys are journaled on the shaft $I^4$ and under the influence of springs $K^4$. Again, if the portions of the slides lying on one side of the dotted line $x$ $x$ should be omitted and the keys be connected to the slides along the line $x$ $x$ as they are shown connected in Fig. 9, so that the slides would be moved in pairs by each key depressed, you would obtain substantially the arrangement and operation of slides hereinbefore described for the triangular form of the device.

In another form of the invention the slides $A^5$ may be formed with straight edges and arranged to cross each other, as illustrated in Fig. 11, which is one arrangement of said form of slides sufficient to illustrate the invention. In this form the slides will have bent portions fitting in slits $C^5$ of the back board or plate $B^5$, so as to be guided in oblique lines when moved by the operating-keys, which are illustrated as arranged in two rows along adjacent edges of the board, said keys being connected to the slides by links $H^6$. It will be observed that in striking any two keys, one in each row, at least two of the slides will be moved, and at the point where said two slides normally cross each other there will be exposed to view whatever object may be placed beneath the two slides at that point, and so it will be throughout the entire number of slides at their intersecting points whenever any two of the keys, one in each row, are depressed.

In Fig. 14 is illustrated another form of the invention in which the slides are straight edged and formed with perforations through which to view the objects to be displayed, said objects being either on or in the back board or plate or placed in the perforations of the underneath slides or slide members. In this form the letter $B^7$ designates the back board or plate, over which is placed the series of slides $A^7$, which are formed with slots $C^7$ to receive pins (not shown) which may project from the back plate or other part, so as to guide the slides in their movement. The slides are made up of members arranged in pairs (in this instance each member of the slide being separate from the other) and connected together and to the operating-lever by links $l^7$ loosely connected to the slides and levers, so that by depressing a lever the pair of slide members connected thereto will be moved, and when two pairs are moved the openings therein will be brought into register, so as to expose to view the object at the point where the two intersecting slides cross each other, the dotted circles indicating the location of the objects at the points of exposure, whether attached to the back plate or carried into such position by the slides, if placed in the openings of one set of slides. The operating-lever in this form is illustrated as an arm $H^7$, sleeved to the fixed rod $I^7$, and having hinged to its free end the shank $m$ of the operating-key, as shown in Fig. 15. The arms of the operating-levers will be held in their normal position by springs $K^7$, which may be of spring sheet metal, secured rigidly to the rod $I^7$, as shown in Fig. 15. The top or face plate is removed from Fig. 14, and for the purpose of spacing the top plate from the slides studs $n^7$ may be applied at appropriate points. It will be observed that in this form the slide members are connected and moved in pairs, as in Fig. 9, but that the members of each pair are made separate from each other and that the members move longitudinally instead of obliquely to their length, as is the case in Fig. 9. I have illustrated under one construction or type of slide the different arrangements which can be made of the slides, so as to expose to view at the points where the slides normally cross each other whatever may be placed beneath the slides at such points, board for receiving the levers of the operating-keys. In each compartment J' there is a fixed shaft I', which serves as the fulcrum for the operating-keys. The operating-keys 1 to 5 are connected to the necks $a'$, $b'$, $c'$, $d'$, and $i'$, respectively, and the keys 6 to 9 at the opposite end of the board are connected to the necks $e'$, $f'$, $g'$, and $h'$ and the key □ to the neck $j'$, respectively, A suitable form of lever for connecting each key to its appropriate slide may be a sleeve $H^2$, journaled so as to turn upon the rod I' and having an arm H' at one end which will connect with the neck of its appropriate slide by its reduced end $l'$, and an arm $H^3$ at its other end, which will be pivotally connected with the shank of its operating-key, so that when the key is depressed the slide with which it is connected will be drawn toward the key. Each key will be under the influence of a spring K', so as to restore the key and its connected slide to their normal position, and each key may be formed with a notch $r'$, which will engage the edge of the opening through which the key-shank passes, so as to hold the key depressed when desired. The reduced end $l'$ of each lever-arm H' will pass through an opening made for it in the neck of its appropriate slide and also in the face-plate, so that the arm may have the proper swing in moving its slide, and the space traversed by the end of the arm in its swing may be covered by an arched portion $F^2$ of the face-plate, as illustrated. Now upon depressing any two of the keys the slides connected therewith will be moved so as to expose to view the opening in the back board or what may be contained therein at the point where said moved slides normally crossed each other, and if it be the multiplication-table that is employed the product of the two members designated by the two depressed keys will be exposed to view at the point where the slides crossed each other. This form of the board is capable of all the varied uses of the first form of the invention described. It will be observed, however, from this modified form of the invention that when any two keys on different edges of the board are depressed the slides are moved from each other—that is, one toward one edge of the board and the other toward the opposite edge—whereas in the first form described the slides are moved toward one edge only of the board when two keys are depressed. This indicates that the principle is the same whether the slides be moved in the same direction or in opposite directions. It may be remarked at this place that it is not essential that the keys should all be arranged along one edge nor in a single row nor in consecutive order numerically, as the principle of operation is the same whatever be the arrangement of the keys. In this modified form of the invention the back board B' may be made sufficiently thick as to permit a cavity or cavities to be made therein edgewise into the board, so as to receive the buttons to be used in connection with the board, and a hinged door $K^2$ may be applied for closing the cavities, so as to hold the buttons therein, as indicated in Fig. 8.

In the two forms of the invention so far described the board or back plate and the slides in their arrangement thereon are in the form of a square; but the board and the arrangement of slides may be in a triangular form, as illustrated in Fig. 9 of the drawings. In this form of the invention the letter $B^2$ designates the back board or plate, which will be formed with openings $D^3$, as in the other forms, and will also be formed with slits $C^3$ to receive bent portions of the slides $A^2$, so that the slides may be guided in their movement, and the slides will be actuated by operating-keys connected therewith, substantially as in the two forms of the invention already described, according as the board will be of the upright or of the first type, the extensions or necks $a^2\ b^2\ c^2\ d^2\ e^2\ f^2\ g^2\ h^2\ i^2\ j^2$ being connected with the arms or levers of the operating-keys so as to move the slides, in this instance all the slides being movable toward the same edge of the board whether the board be upright or flat, and the result of moving the slides will be as in the first two forms described. It will be understood that the board or back plate will be provided with a face-plate having openings corresponding with the openings in the back board or back plate; but the same is not illustrated in this figure, as it will be understood from the illustration given of the first two forms of the invention.

Instead of having slides with their members connected together in pairs, as in the three forms so far described, I may have each slide to consist of only one member, in which case the operating-keys will be duplicated in number and in the numerals employed to designate the same, and with the slides formed to operate as thus indicated they may be arranged to operate either in the form of a square or a triangle. In Fig. 10 I illustrate the slides formed to operate in the manner just mentioned and in this particular instance arranged in the form of a square. In this form the slides are designated by the letter $A^3$ and will have bent portions fitting in the guiding-slits $C^3$ formed in the back board $B^3$, and the operating-keys, which for purposes of illustration run from 1 to 7 only, are arranged in two sets along two adjacent edges of the board, one set along each of the two edges. One set of the keys will be connected with one set of the slides, and the other set of keys will be connected with the other set of slides. Each set of keys will be loosely journaled upon a fixed shaft or rod $I^3$, Fig. 12, and each key will be connected with its appropriate slide by suitable means—for instance, by a connecting-link $H^4$—and each key will be under the influence of a spring $K^4$, so and I have illustrated different types or forms of slides that may be used, but have not under all the forms of slides illustrated the different arrangement of slides for each form, because it will be obvious to the skilled mechanic how to place the slides and connect them with the operating-keys to obtain the different arrangement of slides under each one of the form of slides illustrated, an illustration of the different arrangements under one form of the slides having been given. It will be observed that under all of the different forms of slides and under the different arrangements which may be made of the different forms of slides the same principle of operation is involved. I have also illustrated and described a suitable form of key and manner of connecting the same with the slides for operating the slides, but my invention in its scope is not confined to such details, as there may be many modifications made which will occur to the skilled mechanic and which will be embraced within the spirit and scope of my invention.

From the illustrations and description given it will be obvious that while the device can be used for amusement and also for educational purposes it is also obvious from the illustration given of the manner in which it is operated to ascertain the product of two numbers, one multiplied by the other, that it is adapted for use as a computing device and is also capable of various modifications for carrying out on an enlarged scale the feature of computation. It is also obvious that instead of employing buttons or disks to fit in openings formed in the back plate or board to be exposed to view on moving any two slides that the object to be exposed may be imprinted or otherwise applied direct to the back plate or board itself, so that when any two slides are moved said object will be exposed to view, the principle of operation of the slides being the same in either case.

While there are various novel features involved in the invention, yet there are certain features of novelty that are quite distinctive in themselves and which can be used together or separately, as may be desired, and an illustration of both of such uses are given. For instance, there is the feature of the slides or sliding members movable in lines oblique to their length or longitudinal axis by which a back board or plate of comparatively smaller area is needed for a given exposure in the movement of the sliding members. Again, by the scalloped-edge construction of sliding members or slides less area is required for the moving of the slides, for the reason that the convex edge of one slide will fit in the concave portion of the edge to the other slide, and consequently that much space saved when the two slides come edge to edge.

Another distinctive feature in the preferred construction is in having the slides made up of two members connected in pairs and each slide crossing all the other slides of the series. I have illustrated two methods of connecting the slide members in pairs, in one of which they are connected by necks with which the operating-levers are connected and in the other of which they are connected by links which have connection with the operating-levers. These are given as the preferred forms of construction of the slides, but other methods may be employed and be embraced within this feature of the invention.

Having described my invention and set forth its merits, what I claim is—

1. A device for educational, amusement and other purposes comprising a number of slide members one crossing another and connected together in pairs and adapted upon movement of two slides to expose to view an object at the point of intersection or crossing of the slides, substantially as described.

2. A device for educational, amusement and other purposes comprising a number of slide members one crossing another and operating means connected with the slides to shift the position of the slides and present to view at the point of intersection or crossing of the slides which are moved an object at other times concealed from view, said slide members being connected together in pairs and each pair connected with the operating means, substantially as described.

3. A device for educational, amusement and other purposes, comprising slides one crossing another and arranged to move so that a point in any slide moves obliquely to a line lying in the same plane with and drawn parallel to that part of the slide in which said point is located, and means whereby said slide may be moved, substantially as described.

4. A device for educational, amusement and other purposes, comprising scalloped-edge slides one crossing another and arranged to move obliquely to a line lying in the same plane with and drawn parallel to that part of the slide in which said point is located so as to expose to view an object otherwise concealed from view, and means whereby said slides may be moved, substantially as described.

5. A device for educational, amusement and other purposes, comprising slides arranged to have each of several slides cross all other slides, and means whereby said slides may be moved, substantially as described.

6. A device for educational, amusement and other purposes comprising slides arranged to have each of at least three of such slides cross the other two of said three slides, and means whereby such slides may be moved, substantially as described.

7. A device for educational, amusement and other purposes comprising slide members one crossing another and connected together in pairs, operating means for shifting said slides, said means being numerically designated, and number-designating characters placed at the intersection or crossing of the slides, said characters designating the product of at least two numbers and arranged so that when any two of the operating means are actuated there will be exposed to view at the point of intersection or crossing of the slides actuated by said means the product of the numerals indicated by the operated means, substantially as described.

8. A device for educational, amusement and other purposes, comprising slide members one crossing another, said members being connected together in pairs and arranged to move in oblique lines to a line lying in the same plane with and drawn parallel to that part of the slide member in which said point is located, operating means for shifting said slides, said means being numerically designated, and number-designating characters placed at the intersection or crossing of the slides, said characters designating the product of at least two numbers and arranged so that when any two of the operating means are actuated there will be exposed to view at the point of intersection or crossing of the slides actuated by said means the product of the numerals indicated by the operating means, substantially as described.

9. A device for educational, amusement and other purposes, comprising a number of slides each one crossing all the others, means for shifting said slides, the means for shifting some slides having a marking to distinguish the same from the means for shifting the other slides, and markings applied at the points of crossing or intersecting of the slides, said slides being arranged so that when any two are operated there will be exposed to view at the point of intersection or crossing of the slides actuated by said means the marking indicating the result intended from the markings indicated by the operated shifting means, substantially as described.

In testimony whereof I affix my signature in presence of two witnesses.

WILLIAM H. ROBERTSON.

Witnesses:
M. B. SCHLEY,
GEO. W. REA.